(12) United States Patent
Nozaki

(10) Patent No.: US 8,181,484 B2
(45) Date of Patent: May 22, 2012

(54) PROCESS FOR PRODUCING A THIN-PLATE FORM GLASS MOLDED BODY

(75) Inventor: Moriji Nozaki, Sagamihara (JP)

(73) Assignee: Ohara Inc., Sagamihara-shi, Kanagawa (JP)

( * ) Notice: Subject to any disclaimer, the term of this patent is extended or adjusted under 35 U.S.C. 154(b) by 304 days.

(21) Appl. No.: 12/609,601

(22) Filed: Oct. 30, 2009

(65) Prior Publication Data

US 2010/0107695 A1  May 6, 2010

(30) Foreign Application Priority Data

Oct. 31, 2008 (JP) ................................ 2008-281048

(51) Int. Cl.
*C03B 11/00* (2006.01)
*C03B 11/12* (2006.01)

(52) U.S. Cl. .................... 65/68; 65/72; 65/305

(58) Field of Classification Search ............ 65/305–322, 65/66, 68, 71, 83–85, 122
See application file for complete search history.

(56) References Cited

U.S. PATENT DOCUMENTS

| | | | |
|---|---|---|---|
| 5,192,353 A * | 3/1993 | Trentelman | 65/66 |
| 5,873,921 A * | 2/1999 | Hirota et al. | 65/25.1 |
| 6,003,338 A * | 12/1999 | Yamamoto et al. | 65/102 |
| 6,557,378 B2 * | 5/2003 | Takagi et al. | 65/26 |
| 6,823,694 B2 * | 11/2004 | Sawada et al. | 65/85 |
| 7,143,609 B2 * | 12/2006 | Aitken et al. | 65/26 |
| 7,305,854 B2 * | 12/2007 | Murakami | 65/102 |
| 2006/0090517 A1 * | 5/2006 | Kawata et al. | 65/322 |
| 2007/0084246 A1 * | 4/2007 | Nozaki | 65/319 |
| 2007/0234760 A1 * | 10/2007 | Nozaki | 65/33.1 |

FOREIGN PATENT DOCUMENTS

| JP | 62027334 A | * | 2/1987 |
|---|---|---|---|
| JP | 63307130 A | * | 12/1988 |
| JP | 63310735 A | * | 12/1988 |
| JP | 07165431 A | * | 6/1995 |
| JP | 2004-203698 | | 7/2004 |
| JP | 2008-174402 | | 7/2008 |
| WO | WO 2007139180 A1 | * | 12/2007 |

OTHER PUBLICATIONS

Shibasaki, Takao JP62027334 "Method for Molding an Optical Element" Feb. 5, 1987. As Translated by: Schreiber Translations, Inc. United States Patent and Trademark Office Washington, D.C. Nov. 2011.*

Isamu, Shigyo et al. JP63307130 "Method for Molding Optical Elements" Dec. 14, 1988. As Translated by: Schreiber Translations, Inc. United States Patent and Trademark Office Washington, D.C. Nov. 2011.*

* cited by examiner

*Primary Examiner* — Matthew Daniels
*Assistant Examiner* — Jodi C Franklin
(74) *Attorney, Agent, or Firm* — Rankin, Hill & Clark LLP

(57) ABSTRACT

In a process for a thin-plate form glass molded body, an upper mold part having a pressing surface is used together with a lower mold part having a setting surface arranged to be opposed to the pressing surface. A melted glass lump is pressed between the pressing surface and setting surface. The pressing is performed to set the temperature (° C.) of the thin-plate form glass molded body to a temperature of Tg−20 or higher, and lower than Tg, wherein Tg represents the glass transition point (° C.) of the glass, in a period of 0.8 second or less after the end of the pressing.

18 Claims, 1 Drawing Sheet

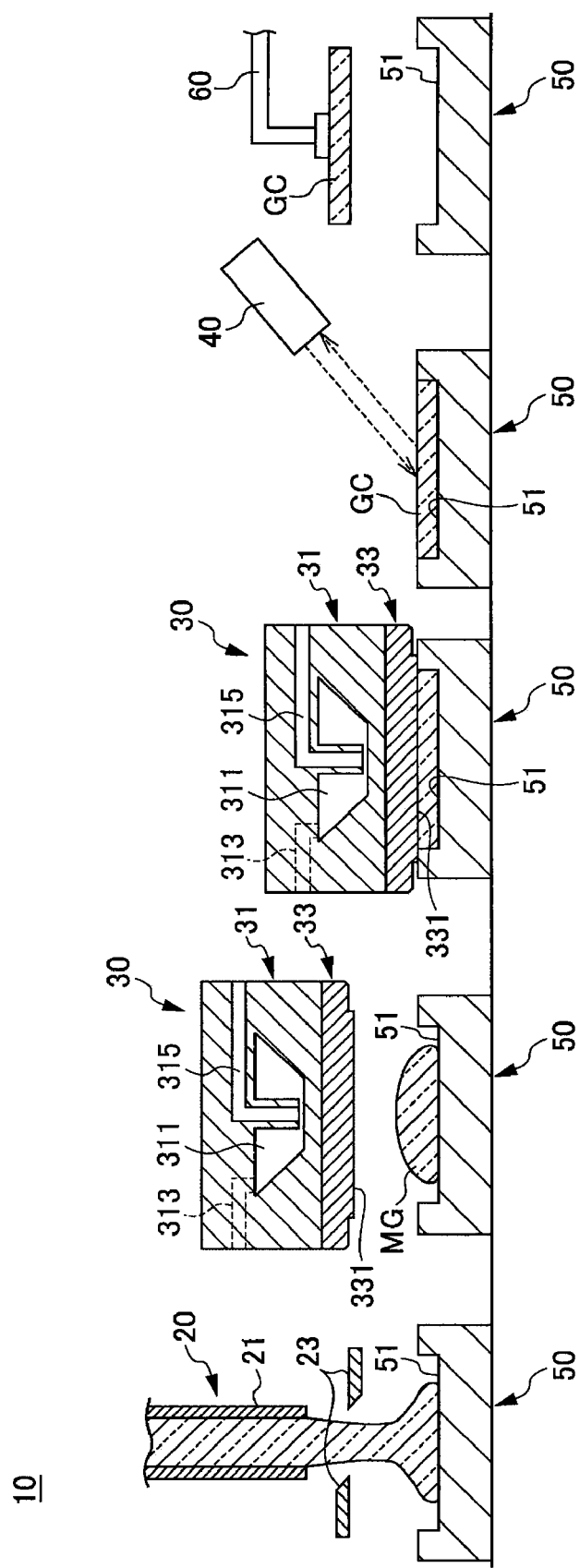

PROCESS FOR PRODUCING A THIN-PLATE FORM GLASS MOLDED BODY

CROSS-REFERENCE TO RELATED APPLICATION

This application is based upon and claims the benefit of priority from the prior Japanese Patent Application No. 2008-281048, filed on Oct. 31, 2008, the entire contents of which are incorporated herein by reference.

BACKGROUND OF THE INVENTION

1. Field of the Invention

The present invention relates to a process for producing a thin-plate form glass molded body, wherein a melted glass is pressed, and a process for producing a disc form magnetic recording medium.

2. Description of the Related Art

A typical example of information recording media having a recording layer that makes use of a nature of magnetism, light, photomagnetism or the like is a disc form magnetic recording medium. As the substrate of the disc form magnetic recording medium, an aluminum substrate has widely been used hitherto. In recent years, however, following a request for a decease in the floating amount of a magnetic head for improving the recording density of the medium, attention has been paid to a glass substrate that can be expected to cause a decrease in the magnetic head floating amount since the substrate is better in flatness and smoothness and the number of surface defects is also smaller than aluminum substrates.

Such a glass substrate is produced by subjecting a plate form glass molded body, which is called a blank material, to polishing process and others. The plate form glass molded body is produced by press molding, a method of cutting a glass plate produced in a floating manner, or some other method. Attention is paid, in particular, to a technique of pressing a melted glass directly (which may be referred to as "direct press" hereinafter) since a particularly high productivity can be expected.

However, when a plate form glass molded body is produced by direct press, the glass is rapidly cooled to be easily cracked or turned into an undesired state since a melted glass, which has a high temperature, is used as a raw material. Thus, Japanese Patent Application Laid-Open No. 2008-174402 discloses a technique of adjusting the temperature (° C.) of a pressing member into the range of "Tg−20" to "Tg+100" wherein Tg represents the glass transition point of a glass to be used, thereby ensuring the quality of a plate form glass molded body.

Incidentally, in the production of a substrate for a disc form magnetic recording medium, the thickness of a blank material for direct press is approximated to the thickness of the substrate as much as possible, thereby improving the ratio of the product amount to the use amount of a raw material to decrease producing costs. In recent years, however, requests for a decrease in costs have been rising up. Thus, it has been desired that a blank material should made even thinner and the production amount per unit period should be made higher (higher-speed press should be realized). However, in the case of using direct press, the following situation is easily caused when the speed of the press is made higher: as the thickness of a target plate form glass molded body is made smaller, the molded body is more easily cracked, deteriorated in flatness, or turned in an undesired state.

SUMMARY OF THE INVENTION

In light of the above-mentioned actual situation, the present invention has been made to provide a process making it possible to produce a high-quality thin-plate form glass molded body by the use of direct press.

The inventors have found out that when a melted glass is pressed to turn the temperature of a thin-plate form glass molded body into a predetermined range in a period of 0.8 second or less after the end of the pressing, the thin-plate form glass molded body can be made so as to have a high quality. Thus, the invention has been made. Specifically, the invention provides the following:

(1) A production process of using an upper mold part having a pressing surface and a lower mold part having a setting surface arranged to be opposed to the pressing surface to press a melted glass between the pressing surface and the setting surface, thereby producing a thin-plate form glass molded body, wherein the pressing of the melted glass is performed to set the temperature (° C.) of the thin-plate form glass molded body to a temperature of Tg−20 or higher, and lower than Tg wherein Tg represents the glass transition point (° C.) in a period of 0.8 second or less after the end of the pressing.

(2) The production process according to item (1), further including the step of adjusting the temperature (° C.) of the pressing surface into a temperature of Tg−220 or higher, and Tg+50 or lower.

(3) The production process according to item (1) or (2), further including the step of adjusting the temperature (° C.) of the setting surface into a temperature of Tg−50 or higher, and Tg+50 or lower.

(4) The production process according to any one of items (1) to (3), wherein the viscosity log η of the melted glass is set to 1 or more and 4 or less at the time of the start of the pressing.

(5) The production process according to any one of items (1) to (4), wherein the upper mold part is a mold part wherein at least its pressing surface includes a silicon carbide/carbon composite ceramic.

(6) The production process according to item (5), wherein the silicon carbide/carbon composite ceramic contains carbon particles in an amount of 15 parts or more by mass and 50 parts or less by mass for 100 parts by mass of silicon carbide.

(7) The production process according to any one of items (1) to (6), wherein the period for the pressing of the melted glass is set to 2.0 seconds or less.

(8) The production process according to any one of items (1) to (7), wherein the thickness of the glass molded body is set to 0.8 mm or less.

(9) The production process according to any one of items (1) to (8), wherein the flatness of the glass molded body is set to 6 μm or less.

(10) A process for producing a disc form magnetic recording medium, wherein a magnetism film is formed over the surface of a glass molded body produced by a production process as recited in any one of items (1) to (9).

According to the invention, a melted glass is pressed to set the temperature (° C.) of the resultant thin-plate form glass molded body to a temperature of "Tg−20" or higher, and lower than Tg in a period of 0.8 second or less after the end of the pressing. Therefore, a high-quality thin-plate form glass molded body can be produced.

BRIEF DESCRIPTION OF THE DRAWING

FIG. 1 is a view illustrating steps of a process for producing a thin-plate form glass molded body according to an embodiment of the invention.

DETAILED DESCRIPTION OF THE INVENTION

With reference to the drawing, an embodiment of the invention will be described hereinafter. However, the invention is not limited to this embodiment. FIG. 1 is a view illustrating steps of a process for producing a thin-plate form glass molded body according to the embodiment. Before the description of the steps of the production process, a description is made about a glass molded body producing apparatus 10 used in this production process.

Glass Molded Body Producing Apparatus

The glass molded body producing apparatus 10 includes a glass supplying device 20, a pressing unit 30, and a lower mold part 50. Each of the constituting elements will be described in detail hereinafter.

Glass Supplying Device

The glass supplying device 20 has a supplying pipe 21, and the base of the supplying pipe 21 is connected to the inside of a non-illustrated melting tank wherein a melted glass is stored. In this manner, the melted glass in the melting tank flows out through the supplying pipe 21 to be supplied into a setting surface 51, which will be described below.

Between the supplying pipe 21 and the setting surface 51, a pair of cutting blades 23 is arranged, between which the flow of the melted glass is sandwiched. When these cutting blades 23 are repeatedly made close to each other or separated from each other, the flow of the melted glass is sequentially cut. Thus, a melt glass lump MG is set onto the setting surface 51.

Pressing Unit

The pressing unit 30 in the embodiment is composed of a heat exchange unit 31 and an upper mold part 33. This upper mold part 33 has a substantially flat pressing surface 331, and by effect of the pressing surface 331, the melted glass lump MG is pressed to be made into a flat plate form. This pressing surface 331 is not particularly limited in structure, and is preferably made larger than the setting surface 51, which will be described below, in order to make the shapes of flat glass pieces to be obtained even.

Inside the heat exchange unit 31, a heat exchange room 311 is formed. Into this heat exchange room 311, a fluid for heat exchange such as water is introduced from an introduction path 315. The introduced fluid for heat exchange is discharged outside from a discharge path 313. In this manner, between the fluid for heat exchange in the heat exchange room 311 and the upper mold part 33, heat exchange is conducted to cool the pressing surface 311 of the upper mold part 33. Thus, the glass is restrained from adhering onto the pressing surface 331 or the setting surface 51. By setting the temperature, the flow rate and other factors of the fluid for heat exchange appropriately, the temperature of the pressing surface 331 can be adjusted. It is preferred that the temperature, the flow rate and other factors of the fluid for heat exchange can be controlled based on a value detected in a temperature detecting unit 40, which will be described below.

Lower Mold Part

The lower mold part 50 has the substantially flat setting surface 51. The setting surface 51 is arranged to be opposed to the pressing surface 331 in substantially parallel to each other. The soft melted glass lump MG is set onto the setting surface 51. The melted glass lump MG set on the setting surface 51 is pressed by means of the pressing surface 331 of the pressing unit 30 and the setting surface 51, so as to be molded into a plate form, as will be described below.

It is preferred that the lower mold part 50 has a temperature adjustor (not illustrated) capable of adjusting the temperature of the setting surface 51. A specific structure of the temperature adjustor is not particularly limited; thus, the temperature adjustor may be, for example a heating device, such as a heating burner, or a coil for induction heating located under the lower mold part 50. As the temperature adjustor, it is preferred that the output thereof can be controlled based on a value detected in the temperature detecting unit 40, which will be described below.

Returning to FIG. 1, the setting surface 51 is depressed from the surroundings. The depth and the width thereof may be set appropriately in accordance with the shape of a plate form glass to be produced. In other words, the depth of the setting surface 51 and the width thereof are related to the thickness of the plate form glass and the size thereof, respectively.

The lower mold part 50 in the embodiment is movably supported on a turntable or the like. The melted glass lump MG is supplied from the supplying pipe 21 onto the setting surface 51 of the lower mold part 50, and then the melted glass lump MG on the setting surface 51 that has been moved under the pressing surface 331 is pressed in accordance with the order melted glass lumps sent thereinto. A driving source of a mechanism for moving the lower mold part 50 is preferably a servo motor to make it possible to cause the melted glass lump MG to move to a position for press quickly (that is, a position under the pressing surface 331). However, the driving source is not limited thereto.

The lower mold part 50 is fixed onto the turntable in the embodiment to restrict the movement thereof in the vertical direction. However, the manner or state of the lower mold part 50 is not limited thereto. Thus, the lower mold part 50 may be fixed on the turntable or the like in the state that the lower mold part 50 can be moved in the vertical direction by a driver.

When the melted glass lump MG is pressed, a thin-plate form glass molded body GC is formed on the setting surface 51. Just after the position for press, that is, the position where the pressing unit 30 is set, the temperature detecting unit 40 is set, and this temperature detecting unit 40 detects the thin-plate form glass molded body GC just after the pressing is finished. The temperature detecting unit 40 does not need to be constantly set. The temperature detecting unit 40 may be set only at the time of setting conditions for the production, such as the temperature of the pressing surface 331 and that of the setting surface 51, or checking the temperature of the thin-plate form glass molded body GC in the middle of the production. The temperature detecting unit 40 may be a contact type or noncontact type temperature-measuring meter, and is preferably a noncontact type temperature-measuring meter such as a laser thermometer or a radiation thermometer. The meter can detect the temperature without damaging the thin-plate form glass molded body GC.

It is preferred that another temperature detecting unit (not illustrated) is set for detecting the temperature of the melted glass lump MG when the pressing thereof is started. Accordingly, the viscosity $\log \eta$ of the melted glass lump MG can be calculated when the pressing is started.

The thus produced thin-plate form glass molded body GC is collected by means of a collecting device 60. The collecting device 60 may suck the thin-plate form glass molded body GC by, for example, a negative pressure.

Process for Producing a Thin-Plate Form Glass Molded Body

The following will describe a process for producing a thin-plate form glass molded body, using the glass molded body producing apparatus 10.

A Melted glass from the melting tank is caused to flow out from the supplying pipe 21, and the flow of the melted glass is sandwiched between the pair of the cutting blades 23, so as to be cut therewith. In this way, the melted glass lump MG is set on the setting surface 51 of the lower mold part 50.

Subsequently, flow for heat exchange is introduced from the introduction path 315 into the heat exchange room 311 while the pressing surface 331 is moved downward to push and press the melted glass lump MG between the pressing surface 331 and the setting surface 51. In this way, the melted glass lump MG on the setting surface 51 is pressed to produce the thin-plate form glass molded body GC.

In the invention, the pressing of the melted glass lump MG is performed to set the temperature (° C.) of the thin-plate form glass molded body GC (the temperature being detected in the temperature detecting unit 40) to a temperature of Tg−20 or higher, and lower than Tg, in a period of 0.8 second or less after the end of the pressing. By controlling the temperatures of the pressing surface 331, the setting surface 51 and the like to set the temperature of the thin-plate form glass molded body GC into the temperature range, the melted glass lump MG is fixed, during the pressing, between the upper mold part 33 and the lower mold part 50 until the melted glass lump MG is solidified. Thus, a glass molded body GC which is superior in flatness can be produced. During the pressing by the use of the upper mold part 33 and the lower mold part 50, it is presumed that the temperature of the melted glass lump MG is lowered to a temperature lower than Tg. By controlling the temperatures of the pressing surface 331, the setting surface 51 and the like to set the temperature of the thin-plate form glass molded body GC into the temperature range, the lowering rate of the temperature of the melted glass lump MG can also be set to such a rate that the thin-plate form glass molded body GC is not easily cracked. As described herein, attention is paid to the temperature of the thin-plate form glass molded body GC in a period of 0.8 second or less after the end of the pressing, and this temperature is turned into the predetermined range by setting temperature conditions of the pressing surface 331, the setting surface 51 and the like, thereby making it possible to set conditions for the production that make an improvement in the flatness compatible with a restraint of cracking of the glass. In the present invention, "Tg" means a glass transition point of pressed glass.

As far as the temperature (° C.) of the thin-plate form glass molded body GC (the temperature being detected in the temperature detecting unit 40) is a temperature of Tg−20 or higher and lower than Tg in a period of 0.8 second or less after the end of the pressing, individual conditions for the pressing are not particularly limited. Generally, it is preferred to shorten the period from the time when the melted glass that has flowed out from the supplying pipe 21 is cut to the end of the pressing. For the shortening of the period, it is desired to shorten the period for the movement of the lower mold part 50 and/or the period for the pressing.

The lower limit of the temperature (° C.) is more preferably Tg−18 or higher, most preferably Tg−15 or higher since a good flatness is obtained and further the glass can be restrained from being cracked with a higher certainty. On the other hand, the upper limit of the temperature (° C.) is more preferably Tg−5 or lower, most preferably Tg−7 or lower since a good flatness is obtained and the upper limit is suitable for the following viewpoints: the viewpoint of a restraint of a deterioration of the setting surface 51 and the pressing surface 331 which contact the melted glass lump MG, and the viewpoint of a limit of the moving rate of the lower mold part 50. The "temperature of the thin-plate form glass molded body" referred to herein denotes the temperature of naked surfaces of the thin-plate form glass molded body.

It is preferred that the process according to the invention has further the step of adjusting the temperature (° C.) of the pressing surface 331 into a temperature of Tg−220 or higher, and Tg−50 or lower. This makes it possible to restrain the glass from being cracked by rapid cooling while the melted glass lump MG is restrained from melting and adhering onto the pressing surface 331. The temperature of the pressing surface 331 is not particularly limited. The temperature may be adjusted by setting appropriately the specific heat capacity, the temperature and the flow rate of the fluid for heat exchange flowing in the heat exchange room 311, the pressing period (i.e., the period when the surface 331 contacts the melted glass lump MG), and the temperature of the melted glass lump MG during the pressing.

The lower limit of the temperature (° C.) of the pressing surface 331 is more preferably Tg−215, most preferably Tg−210 since the glass can be restrained from being cracked by rapid cooling with a higher certainty. The upper limit of the temperature (° C.) of the pressing surface 331 is more preferably Tg−45, most preferably Tg−40 since the melted glass lump MG is restrained from meting and adhering onto the pressing surface 331 with a higher certainty.

It is preferred that the process according to the invention has further the step of adjusting the temperature (° C.) of the setting surface 51 into a temperature of Tg−50 or higher, and Tg+50 or lower. In this way, the melted glass lump MG is restrained from meting and adhering onto the setting surface 51 while an increase in the flatness based on rapid cooling can be restrained. The temperature of the setting surface 51 is not particularly limited. The temperature may be adjusted by setting appropriately the pressing period (i.e., the period when the surface 51 contacts the melted glass lump MG), and the temperature of the melted glass lump MG during the pressing (in the connection the pressing period, by decreasing or increasing the number of lower mold parts 50, the pressing period per lower mold part 50 can be decreased or increased).

The lower limit of the temperature (° C.) of the setting surface 51 is more preferably Tg−20, most preferably Tg−15 since an increase in the flatness based on rapid cooling can be restrained with a higher certainty. The upper limit of the temperature (° C.) of the setting surface 51 is more preferably Tg+30, most preferably Tg+17 since the melted glass lump MG is restrained from meting and adhering onto the setting surface 51 with a higher certainty.

In the invention, it is preferred to set the viscosity $\log \eta$ of the melted glass lump MG to 1 or more and 4 or less at the time of the start of the pressing. In this way, the melted glass lump MG is restrained from melting and adhering onto the setting surface 51 or the pressing surface 331 while a desired deformability is left in the glass in the pressing. Thus, the melted glass lump MG can be pressed in a shorter period, so as to restrain more satisfactorily an increase in the flatness, and cracking of the glass that is easily caused during the pressing.

At the time of the start of the pressing, the lower limit of the viscosity $\log \eta$ of the melted glass lump MG is more preferably 2, most preferably 2.2 since the melted glass lump MG can be further restrained from melting and adhering onto the setting surface 51 or the pressing surface 331. The upper limit of the viscosity $\log \eta$ of the melted glass lump MG at the time is more preferably 2.5, most preferably 2.4 since an increase in the flatness, and cracking of the glass can be further restrained.

In the invention, it is preferred that the upper mold part 33 is a mold part wherein at least its pressing surface 331 is made of a silicon carbide/carbon composite ceramic. In this manner, the upper mold part 33 can keep a good durability certainly against the melted glass lump MG, which is high in temperature, so that a good flatness of the pressing surface 331 is maintained. Thus, thin-plate form glass molded bodies are industrially produced and further a rise in the quality thereof is easily attained. This characteristic is useful for the invention, wherein it is necessary to shorten the period from the cutting of the melted glass that has flowed out from the supplying pipe 21 to the end of the pressing (inevitably, the temperature of the melted glass lump MG becomes high when the melted glass lump MG contacts the pressing surface 331).

The silicon carbide/carbon composite ceramic preferably contains carbon particles in an amount of 15 parts or more by mass and 50 parts or less by mass for 100 parts by mass of silicon carbide. In this manner, a good releasability of the thin-plate form glass molded body GC can be certainly kept while the melted glass lump MG can be restrained from being rapidly cooled because of a poorness in the thermal conductivity thereof. Thus, the thin-plate form glass molded body GC can be expected to be made better in quality.

In the invention, the period for the pressing of the melted glass lump MG (period when the pressing surface 331 contacts the melted glass lamp MG or the thin-plate form glass molded body GC) is preferably set to 2.0 seconds or less. This makes it possible to restrain an increase in the flatness, and cracking of the glass that is easily generated during the pressing. The upper limit of the period for the pressing of the melted glass lump MG is more preferably 0.6 second, most preferably 0.4 second. The lower limit of the pressing period is not particularly limited, and is preferably as short as possible.

In the invention, it is preferred to set the thickness of the thin-plate form glass molded body GC to 0.8 mm or less. By use of the glass molded body GC the thickness of which is exceedingly small as described herein, the amount of polish trash generated in the process for producing a disc form magnetic recording medium or the like can be largely reduced so that a load upon the environment can be decreased. The upper limit of the thickness of the thin-plate form glass molded body GC is more preferably 0.7 mm, most preferably 0.6 mm. The lower limit of the thickness of the thin-plate form glass molded body GC is not particularly limited, and is preferably as small as possible in accordance with the purpose.

In the invention, it is preferred to set the flatness of the glass molded body to 6 μm or less. By use of the thin-plate form glass molded body GC the flatness of which is low as described herein, a high-quality disc form magnetic recording medium can easily be produced. The upper limit of the flatness of the glass molded body is more preferably 5 μm, most preferably 4 μm. The lower limit of the flatness of the thin-plate form glass molded body GC is not particularly limited, and is preferably as small as possible in accordance with the purpose.

When an attempt is made for producing such a thin glass molded body according to any conventional production process, the melted glass MG is rapidly cooled so that a glass molded body which is high in flatness or is cracked is easily produced. However, according to the production process of the invention, a high-quality glass molded body can be produced while a thickness as described above is attained.

The thin-plate form glass molded body produced by the production process of the embodiment of the invention is exceedingly thin and is low in flatness; thus, the thin-plate form glass molded body may be used for various purposes or articles. It is particularly preferred to form a magnetism film on a surface of the thin-plate form glass molded body, thereby producing a disc form magnetic recording medium. More preferably, after the formation of the magnetism film, the film-formed glass molded body is annealed. The step of forming the magnetism film or annealing the body, and conditions for the step may be ones well-known in the prior art. The thin-plate form glass molded body may be made of amorphous glass or crystallized glass.

EXAMPLES

Example 1

As a $SiO_2$—$Li_2O$ based glass having a Tg of 487° C., a thin-plate form glass molded body for a disc form magnetic recording medium substrate was produced by a direct press. The thin-plate form glass molded body obtained by the pressing was a disc having a thickness of 0.74 mm, and a diameter of 67.4 mm. The glass viscosity logη was set into the range of 2.2 to 2.3 at the time of the start of the pressing by use of a mold. The temperature of the pressing surface of its upper mold part and that of the setting surface of its lower mold part were set to 350° C. and 460° C., respectively. The pressing period was set to 0.4 second. Under the conditions, the glass was molded by the pressing. At a time of 0.8 second from the end of the pressing, the temperature of the glass molded body was measured with a contact type thermometer. As a result, the temperature was 470° C.; from this matter, under the above-mentioned production conditions, a production of a thin-plate form glass molded body was repeated.

The flatness of 100 of the thus produced thin-plate form glass molded bodies was measured. As a result, all of the bodies had a flatness of 6 μm or less. In any one of 10000 of the produced thin-plate form glass molded bodies, no crack was generated.

Comparative Example 1

A press molding was conducted in the same way as in Example 1 except that the temperature of the pressing surface of the upper mold part and that of the setting surface of the lower mold part were set to 440° C. and 540° C., respectively. In this example, at a time of 0.8 second from the end of the pressing, the temperature of the glass molded bodies was Tg+30° C. The flatness of the produced glass molded bodies was more than 6 μm.

Comparative Example 2

A press molding was conducted in the same way as in Example 1 except that the temperature of the pressing surface of the upper mold part and that of the setting surface of the lower mold part were set to 250° C. and 350° C., respectively. In this example, at a time of 0.8 second from the end of the pressing, the temperature of the glass molded bodies was Tg−150° C. All of the produced thin-plate form glass molded bodies were cracked.

The invention is not limited to the above-mentioned embodiment, and any modified method, improved method or the like that does not depart from the subject matter of the invention is included in the invention as far as the object of the invention can be attained.

What is claimed is:

1. A production process of using an upper mold part having a pressing surface and a lower mold part having a setting surface arranged to be opposed to the pressing surface to produce a thin-plate form glass molded body, comprising:
   pressing a melted glass between the pressing surface and the setting surface for a period of 0.6 seconds or less,
   wherein the temperature (° C.) of the pressing surface is adjusted during the pressing to a temperature of Tg−220 or higher and Tg−50 or lower and the temperature (° C.) of the setting surface is adjusted during the pressing to a temperature of Tg−20 or higher and Tg+50 or lower wherein Tg represents the glass transition point (° C.) of the glass;
   the pressing of the melted glass is performed to set the temperature (° C.) of the thin-plate form glass molded body to a temperature of Tg−20 or higher, and lower than Tg in a period of 0.8 second or less after the end of the pressing;
   the viscosity log(η in poise) of the melted glass is set to 1 or more and 4 or less at the time of the start of the pressing; and
   when pressing the melted glass, a temperature of the setting surface is controlled by a heating device.

2. The production process according to claim 1, further comprising the step of adjusting the temperature (° C.) of the pressing surface into a temperature of Tg−210 or higher, and Tg−50 or lower.

3. The production process according to claim 1, further comprising the step of adjusting the temperature (° C.) of the setting surface into a temperature of Tg−15 or higher, and Tg+50 or lower.

4. The production process according to claim 1, wherein the upper mold part is a mold part wherein at least its pressing surface comprises a silicon carbide/carbon composite ceramic.

5. The production process according to claim 4, wherein the silicon carbide/carbon composite ceramic contains carbon particles in an amount of 15 parts or more by mass and 50 parts or less by mass for 100 parts by mass of silicon carbide.

6. The production process according to claim 1, wherein the period for the pressing of the melted glass is set to 0.4 seconds or less.

7. The production process according to claim 1, wherein the thickness of the glass molded body is set to 0.8 mm or less.

8. The production process according to claim 1, wherein the flatness of the glass molded body is set to 6 μm or less.

9. The production process according to claim 1, further comprising adjusting the temperature (° C.) of the pressing surface into a temperature of Tg−220 or higher and Tg−50 or lower and adjusting the temperature (° C.) of the setting surface into a temperature of Tg−20 or higher and Tg+30 or lower, wherein the viscosity log(η in poise) of the melted glass is set to 2 or more and 2.5 or less at the time of the start of the pressing.

10. The production process according to claim 1, further comprising adjusting the temperature (° C.) of the pressing surface into a temperature of Tg−220 or higher and Tg−50 or lower and adjusting the temperature (° C.) of the setting surface into a temperature of Tg−15 or higher and Tg+17 or lower, wherein the viscosity log(η in poise) of the melted glass is set to 2 or more and 2.5 or less at the time of the start of the pressing.

11. The production process according to claim 1, wherein the temperature of the pressing surface is controlled by a heat exchange unit.

12. The production process according to claim 1, further comprising detecting the temperature of the glass molded body just after the pressing is finished.

13. The production process according to claim 1, further comprising sucking the glass molded body to remove the glass molded body from the setting surface.

14. A method for producing a glass molded body, comprising:
   pressing a melted glass by an upper mold part and a lower mold part for a period of 2.0 seconds or less to form a glass molded body, wherein when pressing the melted glass, a temperature of one of the upper and lower mold parts is controlled by a heating device; and
   terminating the pressing the melted glass, and
   wherein the temperature (° C.) of the upper mold part is adjusted during the pressing to a temperature of Tg−220 or higher and Tg−50 or lower and the temperature (° C.) of the lower mold part is adjusted during the pressing to temperature of Tg−20 or higher and Tg+50 or lower; and
   the pressing of the melted glass is performed to set a temperature (° C.) of the glass melded body to a temperature of Tg−20 or higher and lower than Tg in a period of 0.8 seconds or less after the end of the pressing.

15. The method of claim 14, wherein the temperature of the upper mold part is controlled by a heat exchange unit and the temperature of the lower mold parts is controlled by a heating device.

16. A method for press forming a glass molded body consisting of:
   providing a melted glass on a setting surface;
   pressing the melted glass on the setting surface by a pressing surface for a period of 0.4 seconds or less to form a glass molded body, wherein a temperature (° C.) of the pressing surface is adjusted during the pressing to a temperature of Tg−220 or higher and Tg−50 or lower and a temperature (° C.) of the setting surface is adjusted during the pressing to a temperature of Tg−20 or higher and Tg+50 or lower wherein Tg represents the glass transition point (° C.) of the glass, the temperature of the pressing surface is controlled by a heat exchange unit, the temperature of the setting surface is controlled by a heating device, and the viscosity log(η in poise) of the melted glass is 1 or more and 4 or less at the time of the start of the pressing; and
   terminating the pressing the melted glass by pulling the pressing surface away from the melted glass,
   wherein the pressing of the melted glass is performed to set the temperature (° C.) of the glass molded body to a temperature of Tg−20 or higher and lower than Tg in a period of 0.8 second or less after the end of the pressing.

17. The method of claim 16, wherein the temperature (° C.) of the pressing surface is adjusted to a temperature of Tg−220 or higher and Tg−50 or lower, the temperature (° C.) of the setting surface is adjusted to a temperature of Tg−20 or higher and Tg+30 or lower, and the viscosity log(η in poise) of the melted glass is set to 2 or more and 2.5 or less at the time of the start of the pressing.

18. The method of claim 16, wherein the temperature (° C.) of the pressing surface is adjusted to a temperature of Tg−220 or higher and Tg−50 or lower, the temperature (° C.) of the setting surface is adjusted to a temperature of Tg−15 or higher and Tg+17 or lower, and the viscosity log(η in poise) of the melted glass is set to 2 or more and 2.5 or less at the time of the start or the pressing.

* * * * *